United States Patent
Hong et al.

(10) Patent No.: US 11,496,687 B2
(45) Date of Patent: Nov. 8, 2022

(54) OPTICAL COMPENSATION DEVICE AND OPTICAL COMPENSATION SYSTEM INCLUDING THE SAME

(71) Applicant: Samsung Display Co., LTD., Yongin-si (KR)

(72) Inventors: Seok Ha Hong, Seoul (KR); Dong Joon Kwag, Yongin-si (KR); Hyung Jin Kim, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/397,387

(22) Filed: Aug. 9, 2021

(65) Prior Publication Data
US 2022/0070352 A1 Mar. 3, 2022

(30) Foreign Application Priority Data
Aug. 26, 2020 (KR) .................... 10-2020-0108014

(51) Int. Cl.
G09G 3/3291 (2016.01)
H04N 5/235 (2006.01)

(52) U.S. Cl.
CPC ......... *H04N 5/2351* (2013.01); *G09G 3/3291* (2013.01); *G09G 2310/08* (2013.01); *G09G 2320/0242* (2013.01); *G09G 2360/16* (2013.01)

(58) Field of Classification Search
CPC ............................................ G09G 2320/0233
See application file for complete search history.

(56) References Cited

U.S. PATENT DOCUMENTS 6,817,721 B1 * 11/2004 Ulichney ............... G09G 3/002
348/E5.073
8,670,006 B2 3/2014 Hong et al.
(Continued)

FOREIGN PATENT DOCUMENTS

KR 10-0818947 4/2008
KR 10-2011-0067620 6/2011
(Continued)

OTHER PUBLICATIONS

International Search Report corresponding to International Application No. PCT/KR2021/011445 dated Dec. 13, 2021.
(Continued)

*Primary Examiner* — Sepehr Azari
(74) *Attorney, Agent, or Firm* — Kile Park Reed & Houtteman PLLC

(57) ABSTRACT

An optical compensation device includes a measurement part that measures a luminance of a reference point of a display panel displaying an image and a luminance of a neighboring point separated from the reference point to generate measurement data, a camera that photographs a surface of the display panel to generate a photographed image, and a compensation part that generates a scaling value of the neighboring point based on the measurement data of the reference point, a photographed data generated based on the photographed image of the reference point, the measurement data of the neighboring point, and a photographed data generated based on the photographed image of the neighboring point, and generates compensation data of the neighboring point based on the scaling value of the neighboring point and the photographed data of the reference point.

20 Claims, 11 Drawing Sheets

(56) References Cited

U.S. PATENT DOCUMENTS

| | | | |
|---|---|---|---|
| 10,665,142 B2* | 5/2020 | Lin | H04N 1/6052 |
| 10,861,362 B2 | 12/2020 | Yoo et al. | |
| 2006/0092183 A1* | 5/2006 | Malmberg | G09G 3/3208 |
| | | | 345/690 |
| 2013/0169700 A1* | 7/2013 | Park | G01J 3/0264 |
| | | | 345/690 |
| 2016/0005348 A1* | 1/2016 | Yanagi | G09G 3/20 |
| | | | 345/600 |
| 2016/0163252 A1* | 6/2016 | Sugiyama | G09G 3/006 |
| | | | 345/589 |
| 2019/0139470 A1* | 5/2019 | Yoo | H04N 13/344 |
| 2019/0228737 A1* | 7/2019 | Lin | G09G 3/006 |
| 2020/0005691 A1* | 1/2020 | Yoo | G09G 3/006 |
| 2022/0059002 A1* | 2/2022 | Park | G09G 5/06 |

FOREIGN PATENT DOCUMENTS

| | | |
|---|---|---|
| KR | 10-2017-0026974 | 3/2017 |
| KR | 10-2018-0061792 | 6/2018 |
| KR | 10-2019-0052195 | 5/2019 |

OTHER PUBLICATIONS

Written Opinion corresponding to International Application No. PCT/KR2021/011445 dated Dec. 13, 2021.

\* cited by examiner

TP: TP1, TP2

OPTICAL COMPENSATION DEVICE AND OPTICAL COMPENSATION SYSTEM INCLUDING THE SAME

CROSS-REFERENCE TO RELATED APPLICATION(S)

This application claims priority to and benefits of Korean Patent Application No. 10-2020-0108014 under 35 U.S.C. § 119, filed on Aug. 26, 2020, in the Korean Intellectual Property Office, the contents of which in its entirety are herein incorporated by reference.

BACKGROUND

1. Technical Field

The disclosure relates to an optical compensation device and an optical compensation system including the same.

2. Description of the Related Art

In a display device, luminance of pixels of the display device may not be uniform. For example, uniformity of the luminance of a display device may be deteriorated due to variations in electrical characteristics of driving transistors between pixels, variations in driving voltages between pixels, and variations in deterioration of light emitting elements between pixels.

Optical compensation devices have been developed to compensate the luminance of a display device using a camera. An image photographed by a camera may have non-uniform luminance due to a vignetting phenomenon, and an optical compensation device may excessively compensate for luminance in a partial area of the display device. In this case, uniformity of the luminance of the display device may not be improved.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide an optical compensation device capable of preventing the vignetting phenomenon of a camera to remove distortion due to the characteristics of the camera, and of improving the luminance uniformity of a display panel through compensation data even when the display panel does not have uniform luminance, and an optical compensation system including the same.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment of the disclosure, an optical compensation device may include a measurement part that measures a luminance of a reference point of a display panel displaying an image and a luminance of at least one neighboring point separated from the reference point and generates measurement data, a camera that photographs a surface of the display panel and generates a photographed image, and a compensation part that generates a scaling value of the at least one neighboring point based on the measurement data of the reference point, a photographed data generated based on the photographed image of the reference point, the measurement data of the at least one neighboring point, and a photographed data generated based on the photographed image of the at least one neighboring point, and generates compensation data of the at least one neighboring point based on the scaling value of the at least one neighboring point and the photographed data of the reference point.

The compensation part may generate the scaling value by multiplying a ratio of the photographed data of the at least one neighboring point to the measurement data of the at least one neighboring point and a ratio of the measurement data of the reference point to the photographed data of the reference point.

The compensation part may generate the compensation data of the at least one neighboring point by multiplying the photographed data of the reference point and the scaling value of the at least one neighboring point.

The compensation part may generate the compensation data of reference point which is the same as the photographed data of the reference point.

The compensation part may perform interpolation based on the compensation data of the reference point and the compensation data of the at least one neighboring point and generates compensation data of a specific point between the reference point and the at least one neighboring point.

In case that the measurement data of the reference point is the same as the measurement data of the at least one neighboring point, and the photographed data of the reference point is larger than the photographed data of the at least one neighboring point, the compensation data of the at least one neighboring point may be smaller than compensation data of the reference point.

In case that the measurement data of the reference point is larger than the measurement data of the at least one neighboring point, and the photographed data of the reference point is the same as the photographed data of the at least one neighboring point, the compensation data of the at least one neighboring point may be larger than compensation data of the reference point.

The measurement part may directly contact the reference point of the display panel or at least one neighboring point of the display panel to measure the luminance of the reference point or the at least one neighboring point.

The compensation part may comprise a pretreatment module that pretreats the photographed image of the camera and generates photographed data corresponding to each of the reference point and the at least one neighboring point, a scaling module that generates the scaling value, and a compensation data generation module that generates the compensation data.

The pretreatment module may align a plurality of pixels of the display panel and a plurality of pixels of the photographed image, the pretreatment module may filter the plurality of pixels of the photographed image, and the pretreatment module may match the plurality of pixels of the photographed image with each of the plurality of pixels of the display panel.

The pretreatment module may filter the plurality of pixels of the photographed image using a Gaussian filter.

The measurement part may measure a luminance of each of red image, green image, and blue image displayed on the display panel and generates measurement data of each of the red image, green image, and blue image.

The measurement part may measure a luminance of a white image displayed on the display panel and generates measurement data of the white image.

According to an embodiment of the disclosure, an optical compensation system may include a display device including a display panel displaying an image, and an optical compensation device that generates compensation data based on an image of the display device. The optical compensation device may include a measurement part that measures a luminance of a reference point of the display panel and a luminance of at least one neighboring point separated from the reference point and generates measurement data, a camera that photographs a surface of the display panel and generates a photographed image, and a compensation part that generates a scaling value of the at least one neighboring point based on the measurement data of the reference point, a photographed data generated based on the photographed image of the reference point, the measurement data of the at least one neighboring point, and a photographed data generated based on the photographed image of the at least one neighboring point, and generates compensation data of the at least one neighboring point based on the scaling value of the at least one neighboring point and the photographed data of the reference point.

The compensation part may generate the scaling value by multiplying a ratio of the photographed data of the at least one neighboring point to the measurement data of the at least one neighboring point and a ratio of the measurement data of the reference point to the photographed data of the reference point.

The compensation part may generate the compensation data of the at least one neighboring point by multiplying the photographed data of the reference point and the scaling value of the at least one neighboring point.

The display device may further include a data driver that supplies a data voltage to a data line of the display panel, a gate driver that supplies a gate signal to a gate line of the display panel, a timing controller that controls driving timings of the data driver and the gate driver, and a memory that stores the compensation data and supplies the compensation data to the timing controller.

The compensation part may generate the compensation data of the at least one neighboring point and may supply the compensation data to the memory.

The timing controller may receive the compensation data of the at least one neighboring point from the memory, and may supply the compensation data and a data control signal for controlling an operation timing of the data driver to the data driver.

The data driver may generate the data voltage based on the compensation data of the at least one neighboring point.

According to the optical compensation device and the optical compensation system including the same according to the embodiments, it is possible to prevent the vignetting phenomenon of the camera to remove distortion due to the characteristics of the camera by generating measurement data of a reference point, photographed data of the reference point, measurement data of a neighboring point, and a scaling value and compensation data reflecting the photographed data of the neighboring point. In addition, the optical compensation device and the optical compensation system including the same may improve the luminance uniformity of the display panel through the compensation data when the display panel does not have uniform luminance.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
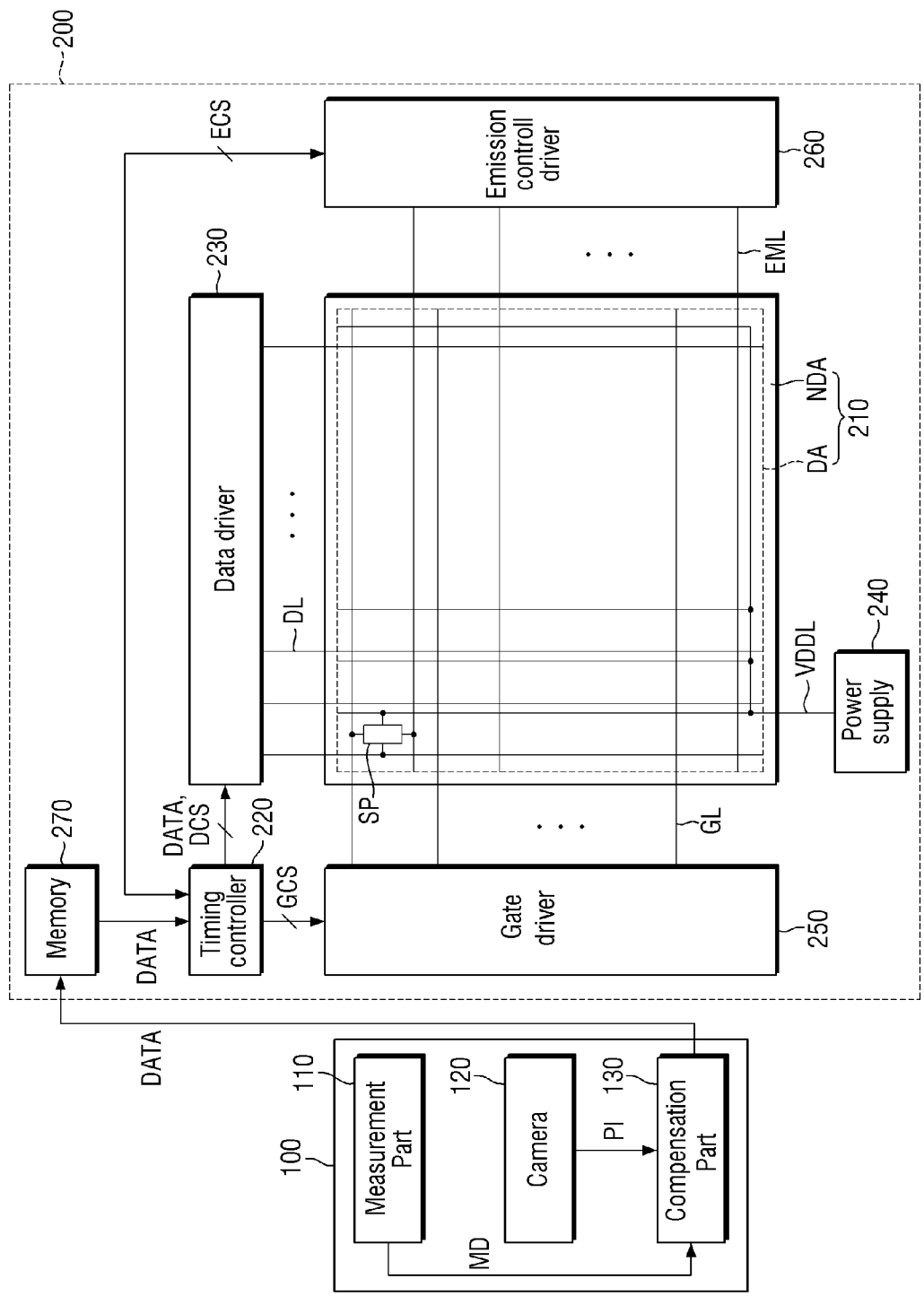
FIG. 1 is a schematic block diagram illustrating an optical compensation system according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
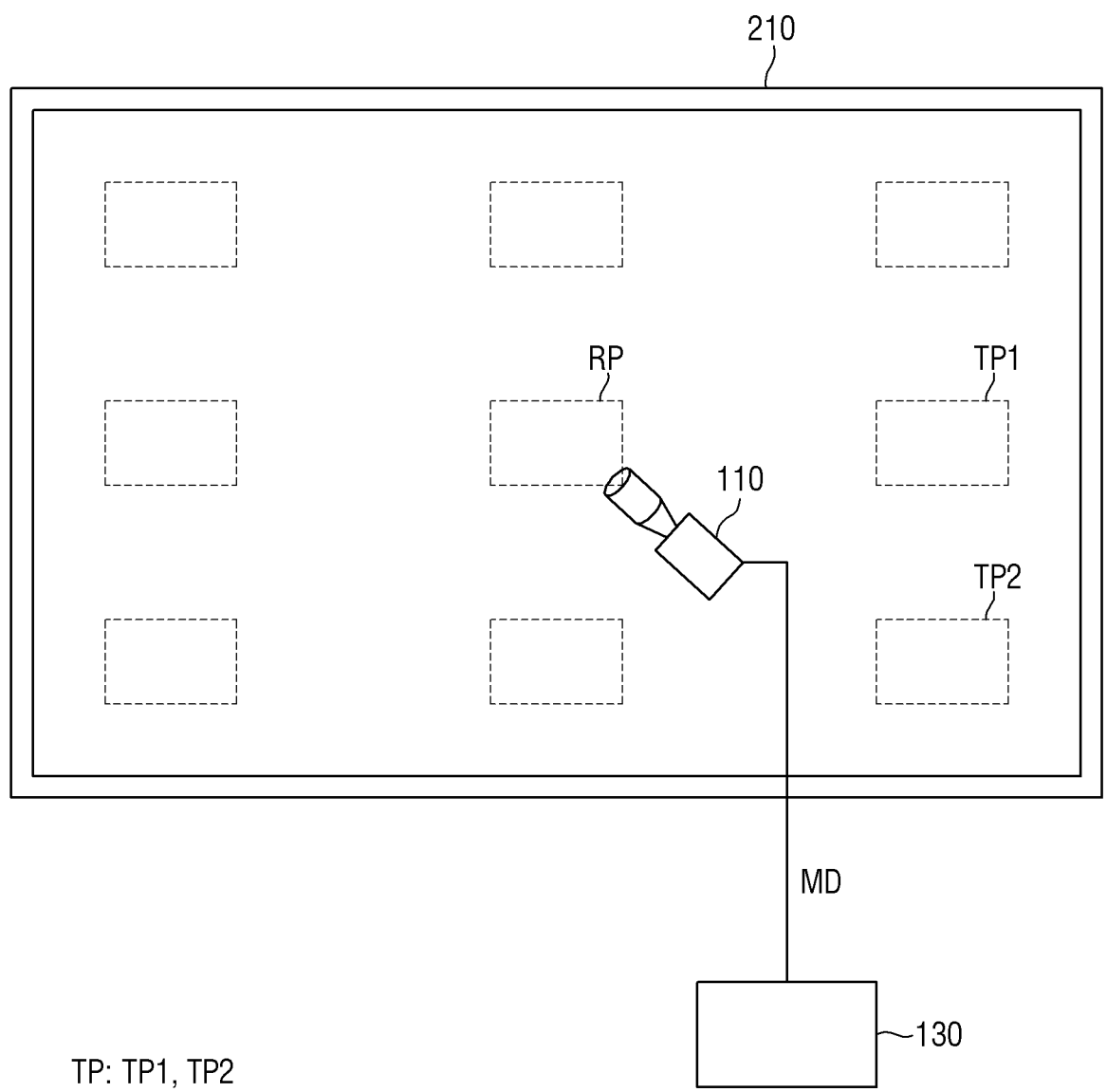
FIG. 2 is a schematic diagram illustrating a process of generating measurement data of a measurement part in the optical compensation system according to an embodiment.
Figure 3:
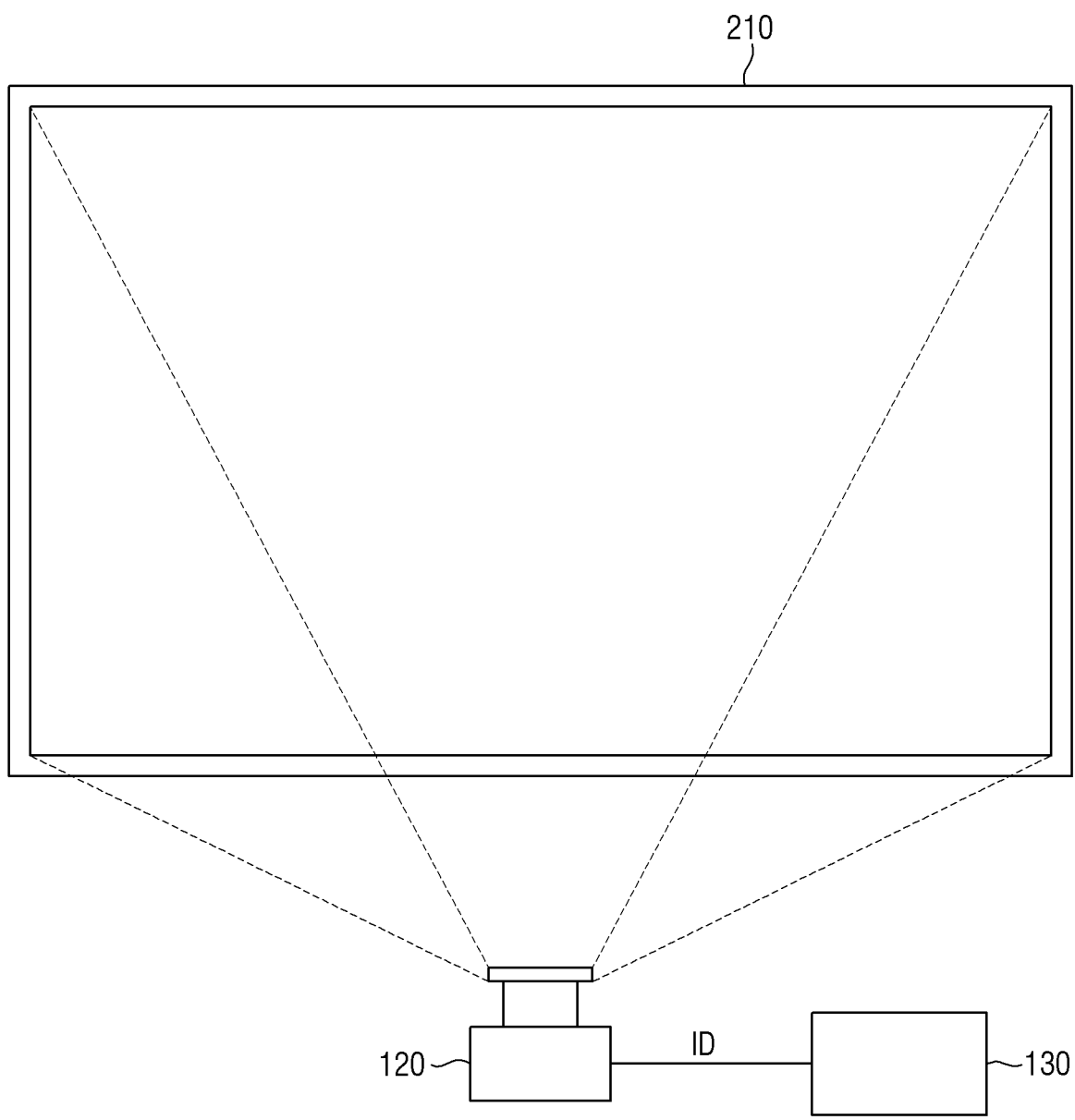
FIG. 3 is a schematic diagram illustrating a process of generating a photographed image of a camera in the optical compensation system according to an embodiment.
Figure 4:
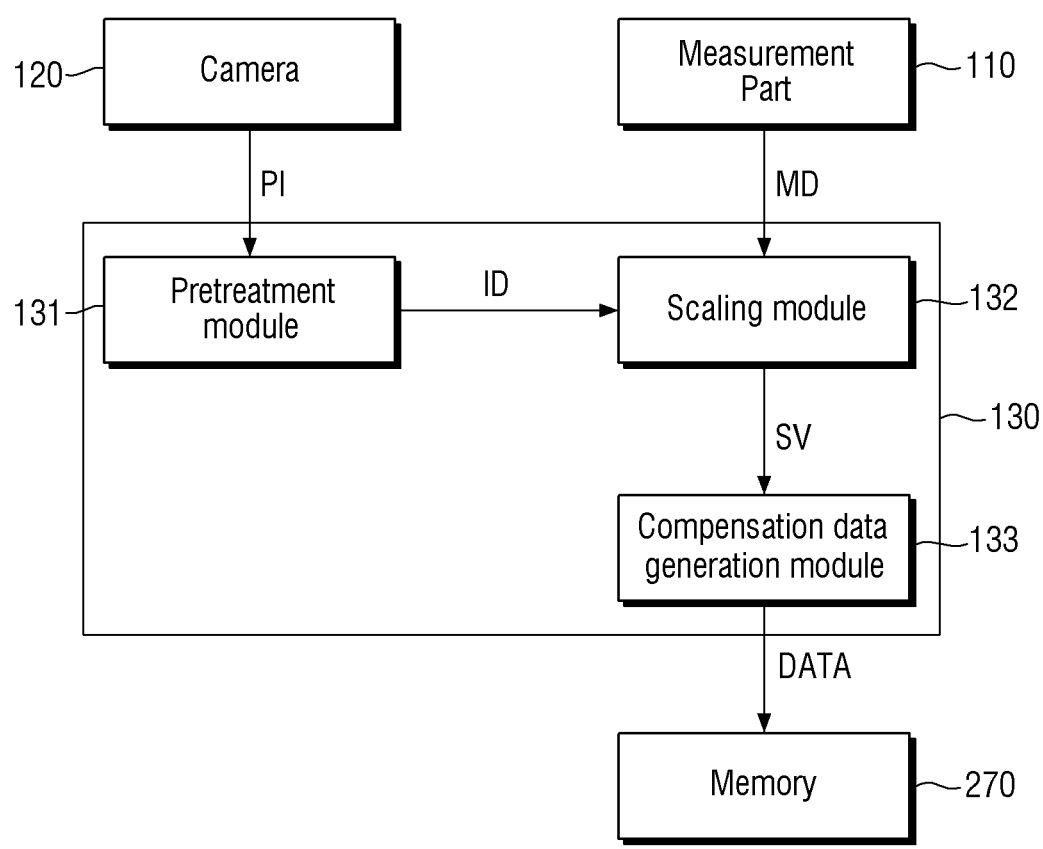
FIG. 4 is a schematic block diagram illustrating a compensation part in the optical compensation system according to an embodiment.

FIG. 1 is a schematic block diagram illustrating an optical compensation system according to an embodiment. FIG. 2 is a schematic diagram illustrating a process of generating measurement data of a measurement part in the optical compensation system according to an embodiment. FIG. 3 is a schematic diagram illustrating a process of generating a photographed image of a camera in the optical compensation system according to an embodiment. FIG. 4 is a schematic block diagram illustrating a compensation part in the optical compensation system according to an embodiment.

Referring to FIGS. 1 to 4, an optical compensation system may include an optical compensation device 100 and a display device 200.

The optical compensation device 100 may generate compensation data DATA based on an image of the display device 200, and provide the compensation data DATA to a memory 270 of the display device 200.

An optical compensation device 100 may include a measurement part 110, a camera 120, and a compensation part 130.

The measurement part 110 may measure the luminance of a specific point of the display panel 210 to generate measurement data MD. The measurement part 110 may measure luminance or chromaticity of a specific point of the display panel 210, and may generate the measurement data MD based on the measured luminance or chromaticity. For example, the measurement part 110 may measure the luminance at the specific point by directly contacting the specific point of the display panel 210, but the method of measuring the luminance is not limited thereto. For example, the measurement part 110 may measure the luminance at the specific point by a non-contact method. The measurement part 110 may measure the luminance of each area of the display panel 210 by measuring the luminance of each of various points of the display panel 210.

The measurement part 110 may measure the luminance of a reference point RP to the generate measurement data MD of the reference point RP. The measurement part 110 may measure the luminance of at least one neighboring point TP to generate the measurement data MD of the neighboring point TP. The measurement part 110 may directly contact each of a first neighboring point TP1 and a second neighboring point TP2 to generate the measurement data MD of the first and second neighboring points TP1 and TP2, but the method of generating the measurement data MD is not limited thereto. For example, the reference point RP may correspond to the center of the display panel 210, the first neighboring point TP1 may correspond to the right boundary of the display panel 210, and the second neighboring point TP2 may correspond to the lower right corner of the display panel 210, but the locations of the reference point RP and the first and second neighboring points TP1 and TP2 are not limited thereto. The measurement part 110 may measure the luminance of neighboring points TP. The optical compensation system may improve luminance uniformity of the display panel 210 as the number of measured neighboring points TP increases. The measurement part 110 may provide the measurement data MD of the reference point RP and the measurement data MD of the first and second neighboring points TP1 and TP2, to the compensation part 130.

For example, the measurement part 110 may measure the luminance of a specific point of the display panel 210 after the display device 200 is manufactured. The measurement part 110 may measure the luminance of the display panel 210 at time points according to the user's designation, and the optical compensation device 100 may generate new compensation data DATA for each time point.

As another example, the measurement part 110 may measure the luminance of a specific point of the display panel 210 and store the measurement data MD during the manufacturing process of the display device 200. The optical compensation device 100 may receive the stored measurement data MD to generate the compensation data DATA.

The camera 120 may photograph a surface (for example, the full or entire surface) of the display panel 210 to generate a photographed image PI. The camera 120 may generate the photographed image PI having luminance information of pixels SP of the display panel 210 to provide the image to the compensation part 130. Accordingly, the photographed image PI may have luminance information of the reference point RP and the first and second neighboring points TP1 and TP2.

The photographed image PI may have non-uniform luminance due to a vignetting phenomenon. The vignetting phenomenon may occur because the luminance of the peripheral portion of the photographed image PI is distorted due to the characteristics of the camera 120. For example, the amount of light from the camera 120 may decrease toward the peripheral portion of the lens of the camera 120. Thus, the photographed image PI of the camera 120 may be different from the actual luminance of the display panel 210. When the full surface of the display panel 210 has a uniform luminance, the luminance of the peripheral portion of the photographed image PI may be lower than the luminance of the central portion of the photographed image PI.

The compensation part 130 may include a pretreatment module 131, a scaling module 132, and a compensation data generation module 133.

The pretreatment module 131 may receive the photographed image PI of the camera 120 and pretreat the photographed image PI. The pretreatment module 131 may improve the contrast of the photographed image PI and remove the noise of the photographed image PI in the pretreatment process, to correct the luminance of the photographed image PI. The pretreatment module 131 may pretreat the photographed image PI to generate photographed data ID corresponding to each of the reference point RP and at least one neighboring point TP.

The pretreatment module 131 may align pixels of the photographed image PI and pixels of the display panel 210. The pretreatment module 131 may filter the pixels of the photographed image PI to match the pixels of the photographed image PI with the pixels of the display panel 210, respectively. The pretreatment module 131 may filter the pixels of the photographed image PI using a Gaussian filter, but the method of filtering the pixels is not limited thereto. For example, the pretreatment module 131 may filter the photographed image PI in units of 4×4 pixels using a Gaussian filter. The pretreatment module 131 may match 4×4 pixels of the photographed image PI with the pixels of the display panel 210, respectively. The pretreatment module 131 may generate the photographed data ID based on a filtered pixel value.

The pretreatment module 131 may pretreat pixels corresponding to the reference point RP in the photographed image PI to generate the photographed data ID of the reference point RP. The pretreatment module 131 may pretreat pixels corresponding to the first neighboring point TP1 in the photographed image PI to generate the photographed data ID of the first neighboring point TP1. The pretreatment module 131 may pretreat pixels corresponding to the second neighboring point TP2 of the photographed image PI to generate the photographed data ID of the second neighboring point TP2.

The scaling module 132 may calculate a scaling value SV of the neighboring point TP based on the measurement data MD of the reference point RP, the photographed data ID of the reference point RP, the measurement data MD of the neighboring point TP, and the photographed data ID of the neighboring point TP. The scaling module 132 may calculate the scaling value SV by multiplying a ratio of the photographed data ID of the neighboring point TP to the measurement data MD of the neighboring point TP and a ratio of the measurement data MD of the reference point RP to the photographed data ID of the reference point RP.

For example, the scaling module 132 may calculate a scaling value SV1 of the first neighboring point TP1 using Eq. 1 below.

$$SV_1 = \frac{ID_1}{MD_1} \times \frac{MD_0}{ID_0} \qquad \text{Eq. 1}$$

In Eq. 1, "$SV_1$" refers to the scaling value of the first neighboring point TP1, "$ID_1$" refers to the photographed data of the first neighboring point TP1, "$MD_1$" refers to the measurement data of the first neighboring point TP1, "$MD_0$" refers to the measurement data of the reference point RP, and "$ID_0$" refers to the photographed data of the reference point RP. Accordingly, the scaling module 132 may calculate the scaling value $SV_1$ of the first neighboring point TP1 by multiplying the ratio of the photographed data $ID_1$ of the first neighboring point TP1 to the measurement data $MD_1$ of the first neighboring point TP1 and the ratio of the measurement data $MD_0$ of the reference point RP to the photographed data $ID_0$ of the reference point RP.

For example, the scaling module 132 may calculate a scaling value SV2 of the second neighboring point TP2 using Eq. 2 below.

$$SV_2 = \frac{ID_2}{MD_2} \times \frac{MD_0}{ID_0} \qquad \text{Eq. 2}$$

In Eq. 2, "$SV_2$" refers to the scaling value of the second neighboring point TP2, "$ID_2$" refers to the photographed data of the second neighboring point TP2, "$MD_2$" refers to the measurement data of the second neighboring point TP2, "$MD_0$" refers to the measurement data of the reference point RP, and "$ID_0$" refers to the photographed data of the reference point RP. Accordingly, the scaling module 132 may calculate the scaling value $SV_2$ of the second neighboring point TP2 by multiplying the ratio of the photographed data $ID_2$ of the second neighboring point TP2 to the measurement data $MD_2$ of the second neighboring point TP2 and the ratio of the measurement data $MD_0$ of the reference point RP to the photographed data $ID_0$ of the reference point RP.

The compensation data generation module 133 may generate the compensation data DATA of the neighboring point TP based on the scaling value SV of the neighboring point TP and the photographed data ID of the reference point RP. The compensation data generation module 133 may calculate the compensation data DATA of the neighboring point TP by multiplying the photographed data ID of the reference point RP and the scaling value SV of the neighboring point TP.

For example, the compensation data generation module 133 may calculate the compensation data $DATA_1$ of the first neighboring point TP1 using Eq. 3 below.

$$DATA_1 = ID_0 \times SV_1 \qquad \text{Eq. 3}$$

In Eq. 3, "$DATA_1$" refers to the compensation data of the first neighboring point TP1, "$ID_0$" refers to the photographed data of the reference point RP, and "$SV_1$" refers to the scaling value of the first neighboring point TP1. Accordingly, the compensation data generation module 133 may calculate the compensation data $DATA_1$ of the first neighboring point TP1 by multiplying the photographed data Do of the reference point RP and the scaling value $SV_1$ of the first neighboring point TP1.

For example, the compensation data generation module 133 may calculate the compensation data $DATA_2$ of the second neighboring point TP2 using Eq. 4 below.

$$DATA_2 = ID_0 \times SV_2 \qquad \text{Eq. 4}$$

In Eq. 4, "$DATA_2$" refers to the compensation data of the second neighboring point TP2, "$ID_0$" refers to the photographed data of the reference point RP, and "$SV_2$" refers to the scaling value of the second neighboring point TP2. Accordingly, the compensation data generation module 133 may calculate the compensation data $DATA_2$ of the second neighboring point TP2 by multiplying the photographed data $ID_0$ of the reference point RP and the scaling value $SV_2$ of the second neighboring point TP2.

The scaling module 132 may set 1 as the scaling value $SV_0$ of the reference point RP. Accordingly, the compensation data generation module 133 may calculate the compensation data $DATA_0$ of the reference point RP that is the same as the photographed data $ID_0$ of the reference point RP.

For example, the scaling module 132 and the compensation data generation module 133 may calculate the scaling value SV and the compensation data DATA of each of the reference point RP and the first and second neighboring points TP1 and TP2 as Table 1 below.

TABLE 1

| | Measurement data (MD) | Photographed data (ID) | Scaling value (SV) | Compensation data (DATA) |
|---|---|---|---|---|
| Reference point (RP) | 100 | 100 | 1 | 100 |
| First neighboring point (TP1) | 100 | 90 | 0.9 | 90 |
| Second neighboring point (TP2) | 90 | 100 | 1.11 | 111 |

In Table 1, in case that the measurement data $MD_0$ of the reference point RP and the measurement data $MD_1$ and the first neighboring point TP1 have a same value, and the photographed data $ID_0$ of the reference point RP is greater than the photographed data $ID_1$ of the first neighboring point TP1, the compensation data $DATA_1$ of the first neighboring point TP1 may be smaller than compensation data $DATA_0$ of the reference point RP. When the measurement data $MD_0$ of the reference point RP is greater than the measurement data $MD_2$ and the second neighboring point TP2, and the photographed data $ID_0$ of the reference point RP and the photographed data $ID_2$ of the second neighboring point TP2 have a same value, the compensation data $DATA_2$ of the second neighboring point TP2 may be greater than compensation data $DATA_2$ of the reference point RP.

The compensation part 130 may provide the compensation data $DATA_0$ of the reference point RP, the compensation data $DATA_1$ of the first neighboring point TP1, and the compensation data $DATA_2$ of the second neighboring point TP2 to the memory 270 of the display device 200.

The compensation part 130 may perform interpolation based on the compensation data $DATA_0$ of the reference point RP and the compensation data $DATA_1$ of the first neighboring point TP1, to generate the compensation data DATA of a specific point between the reference point RP and the first neighboring point TP1. The compensation part 130 may perform interpolation based on the compensation data $DATA_0$ of the reference point RP and the compensation data $DATA_2$ of the second neighboring point TP2, to generate the compensation data DATA of a specific point between the reference point RP and the second neighboring point TP2.

Accordingly, the compensation part 130 may prevent the vignetting phenomenon of the camera 120 to decrease or remove distortion due to the characteristics of the camera 120 by generating the scaling value SV and the compensation data DATA reflecting the measurement data MD of the reference point RP, the photographed data ID of the reference point RP, the measurement data MD of the neighboring point TP, and the photographed data ID of the neighboring point TP. When the display panel 210 does not have a uniform luminance, the compensation part 130 may improve the luminance uniformity of the display panel 210 through the compensation data DATA.

The display device 200 is a device for displaying a moving image or a still image. The display device 200 may be used as a display screen of various products, for example, such as televisions, laptop computers, monitors, billboards and the Internet of Things (JOT) as well as portable electronic devices, for example, such as mobile phones, smart phones, tablet personal computers (tablet PCs), smart watches, watch phones, mobile communication terminals, electronic notebooks, electronic books, portable multimedia players (PMPs), navigation systems and ultra mobile PCs (UMPCs).

The display device 200 may include at least one of an organic light emitting display device using an organic light emitting diode, a quantum dot light emitting display device including a quantum dot light emitting layer, an inorganic light emitting display device including an inorganic light emitting diode, and a micro light emitting display device including a micro light emitting diode.

The display device 200 includes the display panel 210, a timing controller 220, a data driver 230, a power supply 240, a gate driver 250, an emission control driver 260, and the memory 270.

The display panel 210 may include a display area DA in which the pixels SP are formed to display an image and a non-display area NDA corresponding to a peripheral area of the display area DA. The display area DA may include the pixels SP, gate lines GL electrically connected to the pixels SP, emission control lines EML, data lines DL, and driving voltage lines VDDL. The gate lines GL and the emission control lines EML are formed substantially parallel to each other in a first direction (or horizontal direction). The data lines DL and the driving voltage line VDDL may be formed substantially parallel to each other in a second direction (vertical direction) intersecting the first direction.

Each of the pixels SP may include a driving transistor, at least one switching transistor, a light emitting element, and at least one capacitor. The switching transistor may be turned on when a gate signal is applied from the gate line GL. A data voltage of the data line DL may be applied to a gate electrode of the driving transistor. The driving transistor may supply a driving current to the light emitting element according to the data voltage applied to the gate electrode, and the light emitting element may emit light having a luminance according to the magnitude of the driving current. For example, the light emitting element may include at least one of an organic light emitting diode, an inorganic light emitting diode, and a micro light emitting diode. The capacitor may keep constant the data voltage applied to the gate electrode of the driving transistor.

In an embodiment, the non-display area NDA may be defined as an area from the boundary of the display area DA to the edge of the display panel 210.

The timing controller 220 may receive compensation data DATA from the memory 270 and may receive timing signals from a circuit board (not illustrated). The timing controller 220 may generate a data control signal DCS for controlling an operation timing of the data driver 230 based on the timing signals, generate a gate control signal GCS for controlling an operation timing of the gate driver 250, and generate an emission control signal ECS for controlling an operation timing of the emission control driver 260. The timing controller 220 may supply the compensation data DATA and the data control signal DCS to the data driver 230. The timing controller 220 may supply the gate control signal GCS to the gate driver 250 and supply the emission control signal ECS to the emission control driver 260.

The data driver 230 may convert the compensation data DATA into a data voltage to supply the data voltage to the data lines DL through fan-out lines. Gate signals of the gate driver 250 may select the pixels SP to which the data voltage is to be supplied, and the data driver 230 may supply the data voltage to the selected pixels SP.

The power supply 240 may generate a driving voltage and supply the driving voltage to the driving voltage line VDDL. The power supply 240 may generate a common voltage to supply the common voltage to the cathode electrode of a light emitting element of each of the pixels SP. For example, the driving voltage may be a high potential voltage for driving the light emitting element, and the common voltage may be a low potential voltage for driving the light emitting element.

The gate driver 250 may generate gate signals based on the gate control signal GCS and sequentially output the gate signals to the gate lines GL. The gate driver 250 may include thin film transistors. The thin film transistors of the gate driver 250 and the thin film transistors of the pixels SP may be formed on a same layer. For example, the gate driver 250 may be formed in the non-display area NDA on one side (e.g., the left side) of the display area DA, but the location of the gate driver 250 is not limited thereto. As another example, the gate driver 250 may be formed in the non-display area NDA on both sides (e.g., the left and right sides) of the display area DA.

The emission control driver 260 may generate emission control signals according to an emission control signal ECS, and sequentially output the emission control signals to the emission control lines EML.

The memory 270 may receive and store the compensation data DATA from the optical compensation device 100. The memory 270 may supply the compensation data DATA to the timing controller 220.

Figure 5:
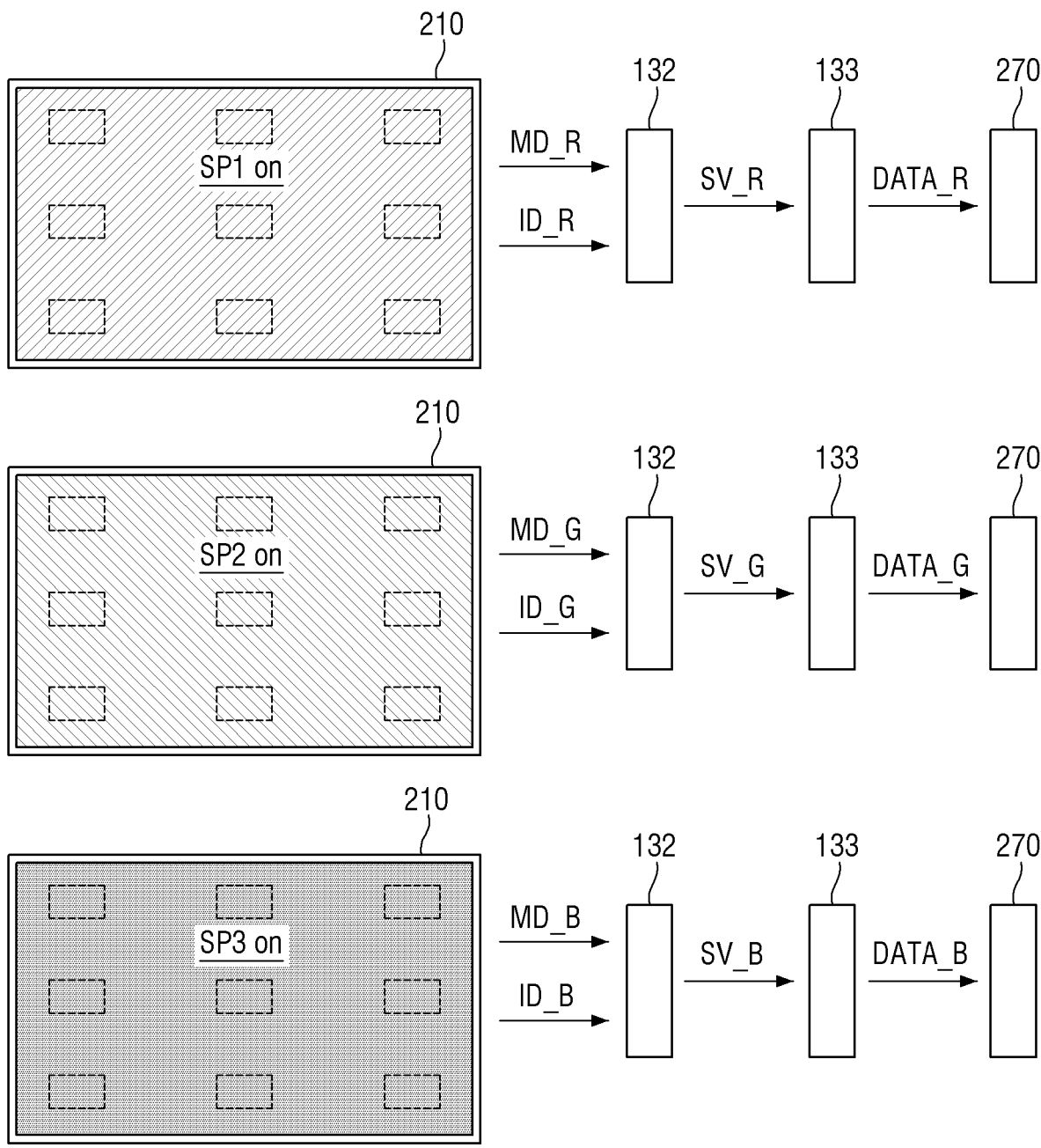
FIG. 5 is a schematic diagram illustrating an example of an optical compensation process in an optical compensation system according to an embodiment.

FIG. 5 is a schematic diagram illustrating an example of an optical compensation process in an optical compensation system according to an embodiment.

Referring to FIG. 5, the display panel 210 may include first to third pixels SP1, SP2, and SP3. For example, the first pixels SP1 may emit light of a first color or red light, and the second pixels SP2 may emit light of a second color or green light, and the third pixels SP3 may emit light of a third color or blue light, but the color of the light from the first to third pixels SP1, SP2, and SP3 is not limited thereto.

When the first pixels SP1 of the display panel 210 emit light of the first color, the measurement part 110 may measure the luminance of the first color image to generate measurement data MD_R. The camera 120 may photograph the display panel 210 displaying an image of the first color to generate the photographed image PI of the first color, and the pretreatment module 131 may generate photographed data ID_R of the first color based on the photographed image PI of the first color. The scaling module 132 may calculate a scaling value SV_R of the first color, and the compensation data generation module 133 may calculate compensation data DATA_R of the first color. Accordingly, the compensation part 130 may provide the compensation data DATA_R of the first color to the memory 270.

When the second pixels SP2 of the display panel 210 emit light of the second color, the measurement part 110 may measure the luminance of the second color image to generate measurement data MD_G. The camera 120 may photograph the display panel 210 displaying an image of the second color to generate the photographed image PI of the second color, and the pretreatment module 131 may generate photographed data ID_G of the second color based on the photographed image PI of the second color. The scaling module 132 may calculate a scaling value SV_G of the second color, and the compensation data generation module 133 may calculate compensation data DATA_G of the second color. Accordingly, the compensation part 130 may provide the compensation data DATA_G of the second color to the memory 270.

When the third pixels SP3 of the display panel 210 emit light of the third color, the measurement part 110 may measure the luminance of the third color image to generate measurement data MD_B. The camera 120 may photograph the display panel 210 displaying an image of the third color to generate the photographed image PI of the third color, and the pretreatment module 131 may generate photographed data ID_B of the third color based on the photographed image PI of the third color. The scaling module 132 may calculate a scaling value SV_B of the third color, and the compensation data generation module 133 may calculate compensation data DATA_B of the third color. Accordingly, the compensation part 130 may provide the compensation data DATA_B of the third color to the memory 270.

Accordingly, the optical compensation device 100 may generate the compensation data DATA based on each of the image of the first color, the image of the second color, and the image of the third color of the display panel 210, and may improve the luminance uniformity of the image of the first color, the image of the second color, and the image of the third color of the display panel 210.

Figure 6:
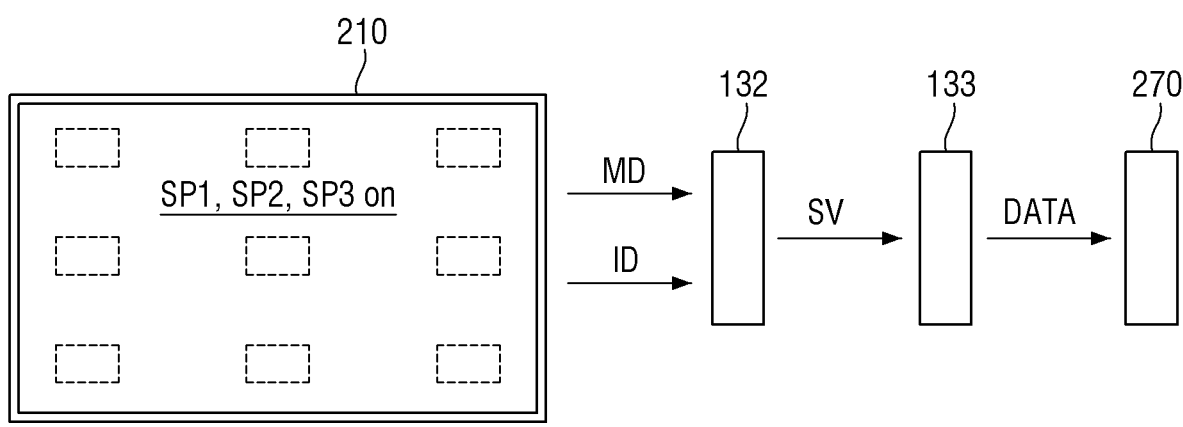
FIG. 6 is a schematic diagram illustrating another example of an optical compensation process in an optical compensation system according to an embodiment.

FIG. 6 is a schematic diagram illustrating another example of an optical compensation process in an optical compensation system according to an embodiment.

Referring to FIG. 6, the display panel 210 may include first to third pixels SP1, SP2, and SP3. For example, the first pixels SP1 may emit light of a first color or red light, and the second pixels SP2 may emit light of a second color or green light, and the third pixels SP3 may emit light of a third color or blue light, but the color of the light is not limited thereto.

When the first to third pixels SP1, SP2, and SP3 of the display panel 210 emit light, the display panel 210 may emit white light. The measurement part 110 may measure the luminance of white light to generate the measurement data MD. The camera 120 may photograph the display panel 210 displaying an image of a white color to generate the photographed image PI of the white color, and the pretreatment module 131 may generate photographed data ID of the white color based on the photographed image PI of the white color. The scaling module 132 may calculate the scaling value SV of the white color, and the compensation data generation module 133 may calculate the compensation data DATA of the white color. Accordingly, the compensation part 130 may provide the compensation data DATA of the white color to the memory 270.

Figure 7:
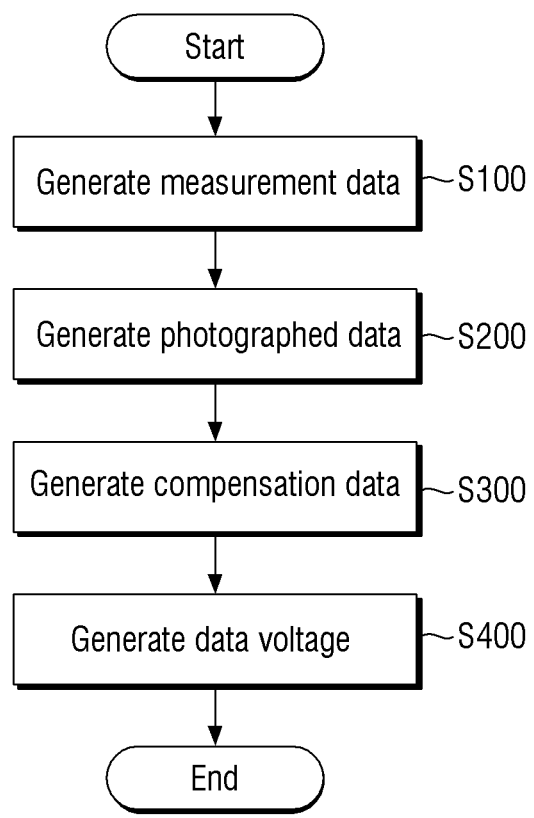
FIG. 7 is a flowchart illustrating an optical compensation process in an optical compensation system according to an embodiment.

FIG. 7 is a flowchart illustrating an optical compensation process in an optical compensation system according to an embodiment.

Referring to FIG. 7, the measurement part 110 may measure the luminance of a specific point of the display panel 210 to generate the measurement data MD (step S100). The measurement part 110 may measure luminance or chromaticity of a specific point of the display panel 210, and may generate the measurement data MD based on the measured luminance or chromaticity.

The camera 120 may photograph a surface (for example, the full or entire surface) of the display panel 210 to generate the photographed image PI. The pretreatment module 131 may receive the photographed image PI of the camera 120 to pretreat the photographed image PI. The pretreatment module 131 may pretreat the photographed image PI to generate the photographed data ID corresponding to each of the reference point RP and at least one neighboring point (step S200).

The scaling module 132 may generate the scaling value SV of the neighboring point TP based on the measurement data MD of the reference point RP, the photographed data ID of the reference point RP, the measurement data MD of the neighboring point TP, and the photographed data ID of the neighboring point TP. The compensation data generation module 133 may generate the compensation data DATA of the neighboring point TP based on the scaling value SV of the neighboring point TP and the photographed data ID of the reference point RP (step S300).

The compensation part 130 may provide the generated compensation data DATA to the memory 270 of the display device 200. The timing controller 220 may receive compensation data DATA from the memory 270 and may receive timing signals from a circuit board (not illustrated). The data driver 230 may receive the compensation data DATA from the timing controller 220 to generate a data voltage (step S400).

The data driver 230 may supply the data voltage to the data lines DL. Gate signals of the gate driver 250 may select the pixels SP to which the data voltage is to be supplied, and the data driver 230 may supply the data voltage to the selected pixels SP.

Figure 8:
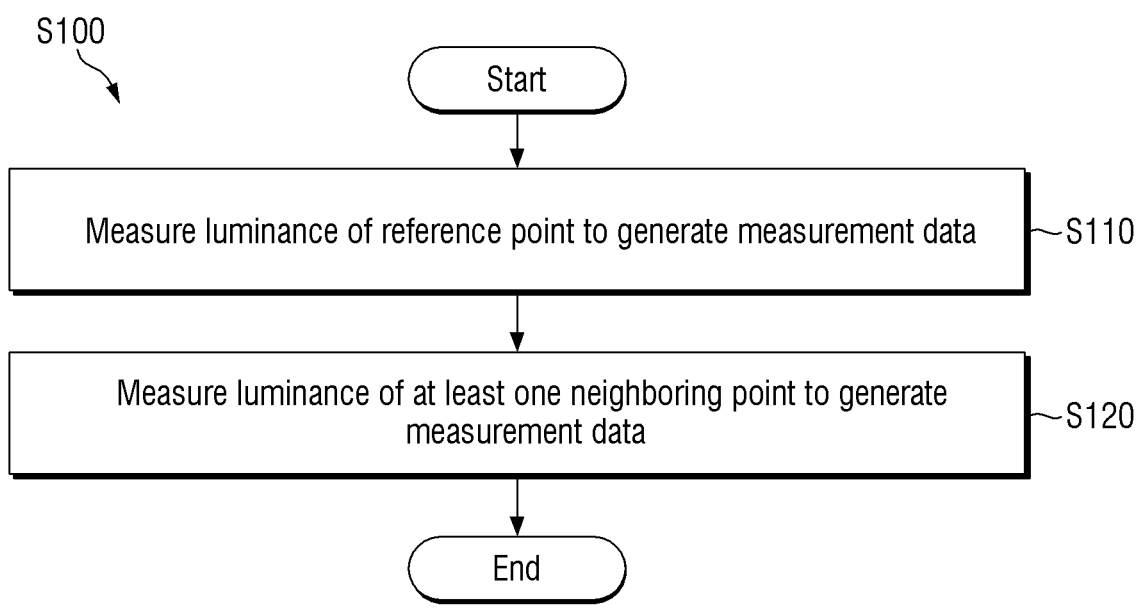
FIG. 8 is a flowchart illustrating a process of generating measurement data illustrated in FIG. 7 in the optical compensation system according to an embodiment.

FIG. 8 is a flowchart illustrating a process of generating measurement data illustrated in FIG. 7 in the optical compensation system according to an embodiment.

Referring to FIG. 8, the measurement part 110 may measure luminance or chromaticity of a specific point of the display panel 210, and may generate the measurement data MD based on the measured luminance or chromaticity. For example, the measurement part 110 may directly contact a specific point of the display panel 210 to measure the luminance of the specific point, but the method of measuring the luminance is not limited thereto.

The measurement part 110 may measure the luminance of the reference point RP to generate the measurement data $MD_0$ of the reference point RP (step S110).

The measurement part 110 may measure the luminance of at least one neighboring point TP to generate the measurement data MD of the neighboring point TP (step S120). For example, the measurement part 110 may measure the luminance of the first neighboring point TP1 to generate the measurement data $MD_1$ of the first neighboring point TP1, and may measure the luminance of the second neighboring point TP2 to generate the measurement data $MD_2$ of the second neighboring point TP2.

Figure 9:
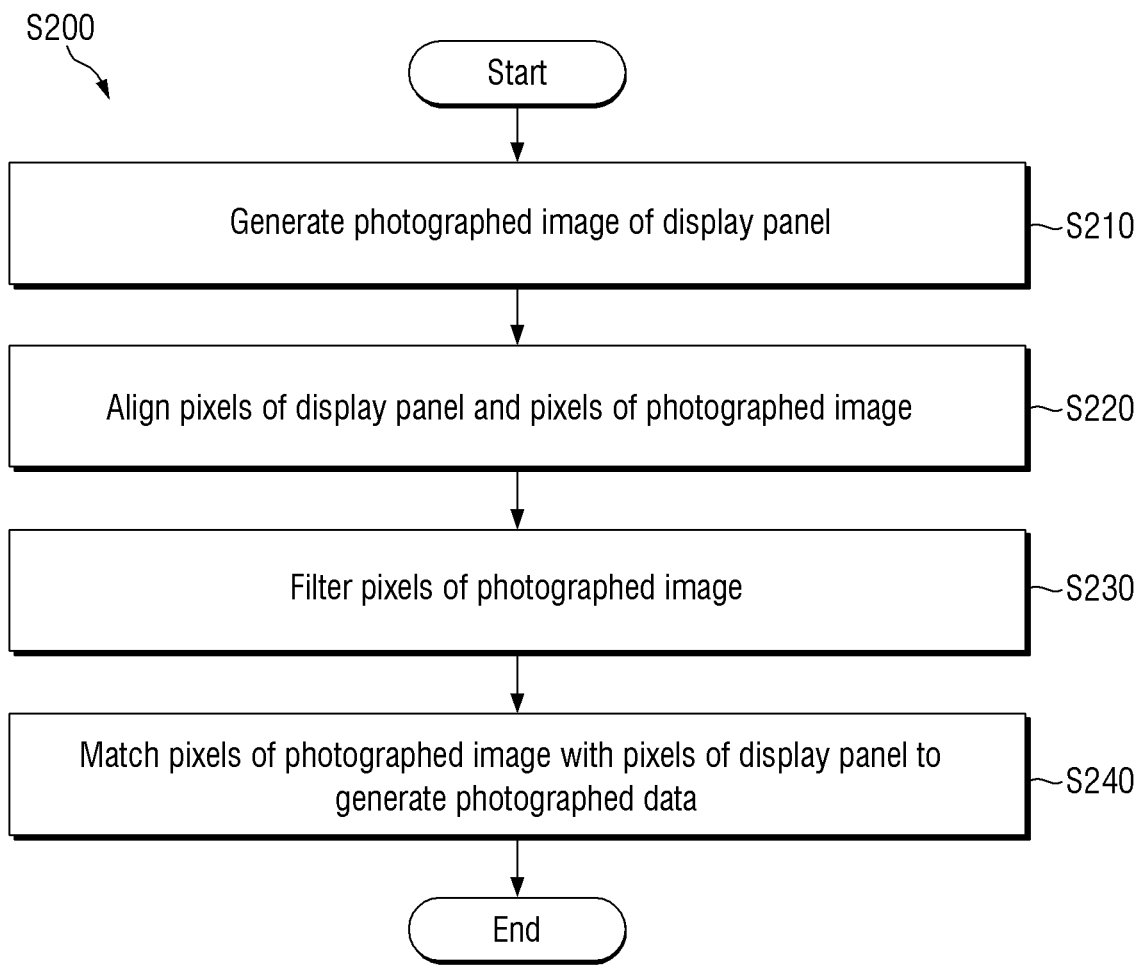
FIG. 9 is a flowchart illustrating a process of generating photographed data illustrated in FIG. 7 in an optical compensation system according to an embodiment.

FIG. 9 is a flowchart illustrating a process of generating photographed data illustrated in FIG. 7 in an optical compensation system according to an embodiment.

Referring to FIG. 9, the camera 120 may photograph the full surface of the display panel 210 to generate the photographed image PI (step S210).

The pretreatment module 131 may receive the photographed image PI of the camera 120 to pretreat the photographed image PI. The pretreatment module 131 may align pixels of the photographed image PI and pixels of the display panel 210 (step S220).

The pretreatment module 131 may filter the pixels of the photographed image PI (step S230). For example, the pretreatment module 131 may filter the pixels of the photographed image PI using a Gaussian filter, but the method of filtering the pixels is not limited thereto.

The pretreatment module 131 may match the pixels of the photographed image PI with the pixels of the display panel 210, respectively, to generate the photographed data ID (step S240).

Figure 10:
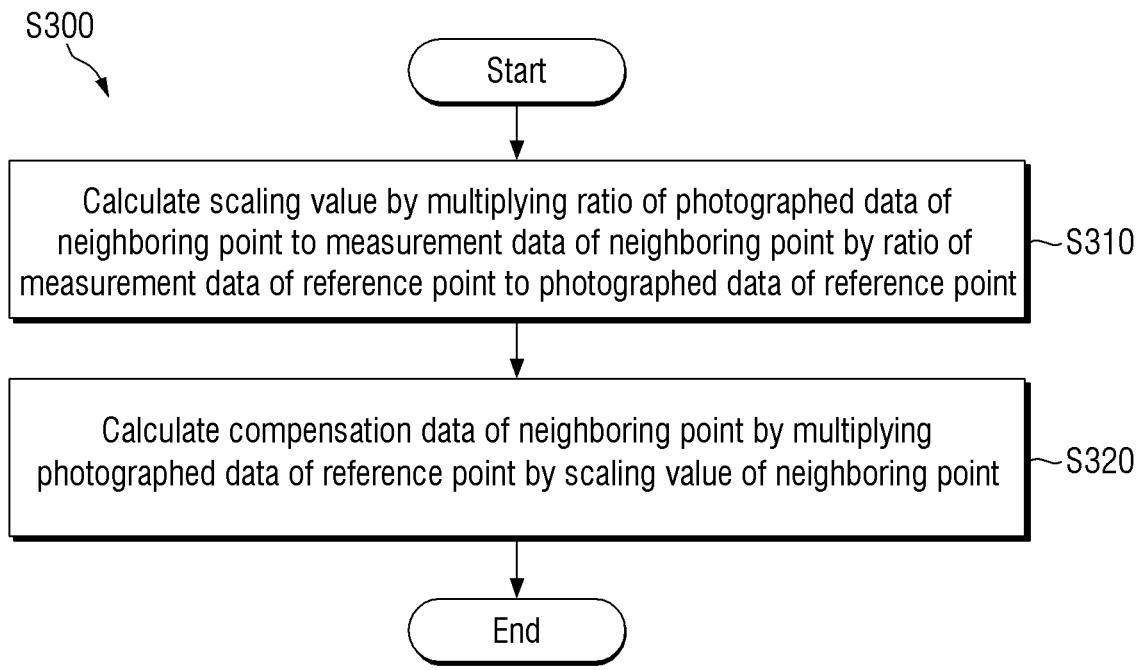
FIG. 10 is a flowchart illustrating a process of generating compensation data illustrated in FIG. 7 in an optical compensation system according to an embodiment.

FIG. 10 is a flowchart illustrating a process of generating compensation data illustrated in FIG. 7 in an optical compensation system according to an embodiment.

Referring to FIG. 10, the scaling module 132 may generate the scaling value SV of the neighboring point TP based on the measurement data MD of the reference point RP, the photographed data ID of the reference point RP, the measurement data MD of the neighboring point TP, and the photographed data ID of the neighboring point TP. The scaling module 132 may calculate the scaling value SV by multiplying the ratio of the photographed data ID of the neighboring point TP to the measurement data MD of the neighboring point TP and the ratio of the measurement data MD of the reference point RP to the photographed data ID of the reference point RP (step S310).

The compensation data generation module 133 may generate the compensation data DATA of the neighboring point TP based on the scaling value SV of the neighboring point TP and the photographed data ID of the reference point RP. The compensation data generation module 133 may calculate the compensation data DATA of the neighboring point TP by multiplying the photographed data ID of the reference point RP and the scaling value SV of the neighboring point TP (step S320).

Figure 11:
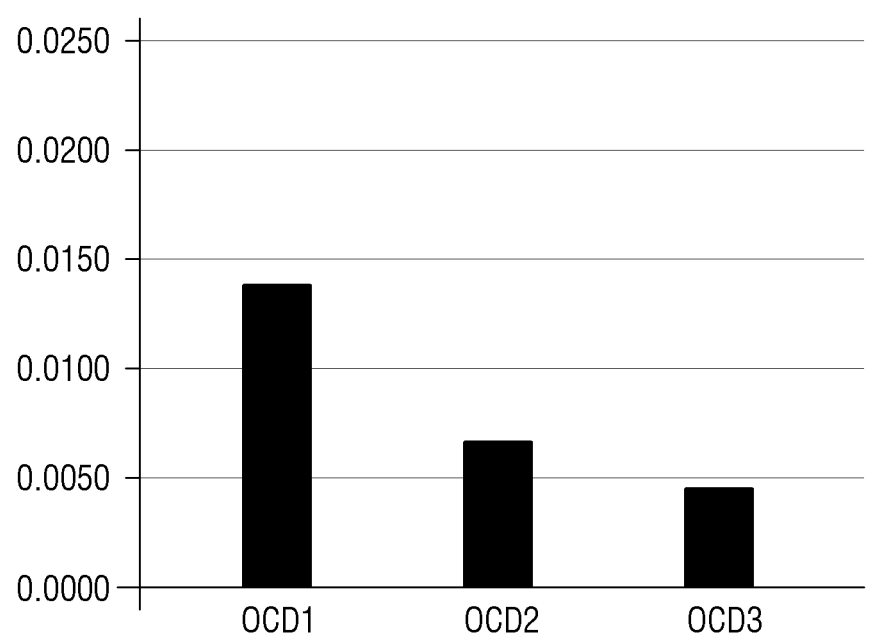
FIG. 11 is a graph illustrating color coordinates characteristics of an optical compensation system according to an embodiment.

FIG. 11 is a graph illustrating color coordinates characteristics of an optical compensation system according to an embodiment. For example, FIG. 11 illustrates color coordinates Δu'v' of a first display device OCD1 that does not perform optical compensation, a second display device OCD2 that performs optical compensation using a camera, and a third display device OCD3 that performs optical compensation using the optical compensation device 100 illustrated in FIGS. 1 to 4.

Referring to FIG. 11, the first display device OCD1 may have the color coordinate Δu'v' of 0.0137, the second display device OCD2 may have the color coordinate Δu'v' of 0.0066, and the third display device OCD3 may have the color coordinate Δu'v' of 0.0044. The color coordinate Δu'v' refers to the maximum value of the color deviation between two points of the display panel 210. As the color coordinate Δu'v' of the display device decreases, the luminance uniformity of the display device may be improved.

For example, since the first display device OCD1 does not perform optical compensation, the first display device OCD1 may have the color coordinate Δu'v' higher than the color coordinates of the second and third display devices OCD1 and OCD2. The second display device OCD2 may perform optical compensation using the camera, but may have the color coordinate Δu'v' higher than the color coordinate of the third display device OCD3 due to the vignetting phenomenon of the camera.

Accordingly, the optical compensation device 100 and an optical compensation system including the optical compensation device 100 may prevent the vignetting phenomenon of the camera 120 to remove distortion due to the characteristics of the camera 120 by generating the scaling value SV and the compensation data DATA reflecting the measurement data MD of the reference point RP, the photographed data ID of the reference point RP, the measurement data MD of the neighboring point TP, and the photographed data ID of the neighboring point TP. The optical compensation device 100 and an optical compensation system including the optical compensation device 100 may improve the luminance uniformity of the display panel 210 through the compensation data DATA when the display panel 210 does not have a uniform luminance.

While the invention has been illustrated and described with reference to the embodiments thereof, it will be apparent to those of ordinary skill in the art that various changes in form and detail may be formed thereto without departing from the spirit and scope of the invention.

What is claimed is:

1. An optical compensation device comprising:
a measurement part that measures a luminance of a reference point of a display panel displaying an image and a luminance of at least one neighboring point separated from the reference point and generates measurement data;
a camera that photographs a surface of the display panel and generates a photographed image; and
a compensation part that includes circuitry and that generates a scaling value of the at least one neighboring point based on the measurement data of the reference point, a photographed data generated based on the photographed image of the reference point, the measurement data of the at least one neighboring point, and a photographed data generated based on the photographed image of the at least one neighboring point, and generates compensation data of the at least one neighboring point based on the scaling value of the at least one neighboring point and the photographed data of the reference point.

2. The optical compensation device of claim 1, wherein the compensation part generates the scaling value by multiplying a ratio of the photographed data of the at least one neighboring point to the measurement data of the at least one neighboring point and a ratio of the measurement data of the reference point to the photographed data of the reference point.

3. The optical compensation device of claim 1, wherein the compensation part generates the compensation data of the at least one neighboring point by multiplying the photographed data of the reference point and the scaling value of the at least one neighboring point.

4. The optical compensation device of claim 1, wherein the compensation part generates compensation data of the reference point which is the same as the photographed data of the reference point.

5. The optical compensation device of claim 4, wherein the compensation part performs interpolation based on the compensation data of the reference point and the compensation data of the at least one neighboring point and generates compensation data of a specific point between the reference point and the at least one neighboring point.

6. The optical compensation device of claim 1, wherein in case that the measurement data of the reference point is the same as the measurement data of the at least one neighboring point, and the photographed data of the reference point is larger than the photographed data of the at least one neighboring point, the compensation data of the at least one neighboring point is smaller than compensation data of the reference point.

7. The optical compensation device of claim 1, wherein in case that the measurement data of the reference point is larger than the measurement data of the at least one neighboring point, and the photographed data of the reference point is the same as the photographed data of the at least one neighboring point, the compensation data of the at least one neighboring point is larger than compensation data of the reference point.

8. The optical compensation device of claim 1, wherein the measurement part directly contacts the reference point of the display panel or at least one neighboring point of the display panel to measure the luminance of the reference point or the at least one neighboring point.

9. The optical compensation device of claim 1, wherein the compensation part pretreats the photographed image of the camera and generates photographed data corresponding to each of the reference point and the at least one neighboring point, that generates the scaling value, and generates the compensation data.

10. The optical compensation device of claim 9, wherein
the compensation part aligns a plurality of pixels of the display panel and a plurality of pixels of the photographed image,
the compensation part filters the plurality of pixels of the photographed image, and
the compensation part matches the plurality of pixels of the photographed image with each of the plurality of pixels of the display panel.

11. The optical compensation device of claim 10, wherein the compensation part filters the plurality of pixels of the photographed image using a Gaussian filter.

12. The optical compensation device of claim 1, wherein the measurement part measures a luminance of each of red image, green image, and blue image displayed on the display panel and generates measurement data of each of the red image, green image, and blue image.

13. The optical compensation device of claim 1, wherein the measurement part measures a luminance of a white image displayed on the display panel and generates measurement data of the white image.

14. An optical compensation system comprising:
a display device including a display panel displaying an image; and
an optical compensation device that generates compensation data based on an image of the display device,
wherein the optical compensation device comprises:
a measurement part that measures a luminance of a reference point of the display panel and a luminance of at least one neighboring point separated from the reference point and generates measurement data;
a camera that photographs a surface of the display panel and generates a photographed image; and
a compensation part that includes circuitry and that generates a scaling value of the at least one neighboring point based on the measurement data of the reference point, a photographed data generated based on the photographed image of the reference point, the measurement data of the at least one neighboring point, and a photographed data generated based on the photographed image of the at least one neighboring point, and generates compensation data of the at least one neighboring point based on the scaling value of the at least one neighboring point and the photographed data of the reference point.

15. The optical compensation system of claim 14, wherein the compensation part generates the scaling value by multiplying a ratio of the photographed data of the at least one neighboring point to the measurement data of the at least one neighboring point and a ratio of the measurement data of the reference point to the photographed data of the reference point.

16. The optical compensation system of claim 14, wherein the compensation part generates the compensation data of the at least one neighboring point by multiplying the photographed data of the reference point and the scaling value of the at least one neighboring point.

17. The optical compensation system of claim 14, wherein the display device further includes:
a data driver that supplies a data voltage to a data line of the display panel;
a gate driver that supplies a gate signal to a gate line of the display panel;
a timing controller that controls driving timings of the data driver and the gate driver; and
a memory that stores the compensation data and supplies the compensation data to the timing controller.

18. The optical compensation system of claim 17, wherein the compensation part generates the compensation data of the at least one neighboring point and supplies the compensation data to the memory.

19. The optical compensation system of claim 17, wherein the timing controller receives the compensation data of the at least one neighboring point from the memory, and supplies the compensation data and a data control signal for controlling an operation timing of the data driver to the data driver.

20. The optical compensation system of claim 17, wherein the data driver generates the data voltage based on the compensation data of the at least one neighboring point.

* * * * *